INVENTOR.
WALDEMAR F. MAYER
BY
ATTORNEY

INVENTOR.
WALDEMAR F. MAYER

INVENTOR.
WALDEMAR F. MAYE
BY
ATTORNEY

June 19, 1951      W. F. MAYER      2,557,101

AIRCRAFT COOLING SYSTEM AND METHOD

Filed April 3, 1950      5 Sheets-Sheet 5

INVENTOR.
WALDEMAR F. MAYER
BY
ATTORNEY

Patented June 19, 1951

2,557,101

UNITED STATES PATENT OFFICE 2,557,101

AIRCRAFT COOLING SYSTEM AND METHOD

Waldemar F. Mayer, Los Angeles, Calif., assignor to The Garrett Corporation, Los Angeles, Calif., a corporation of California Application April 3, 1950, Serial No. 153,626

47 Claims. (Cl. 62—136)

This invention relates to air conditioning systems for air to be delivered under pressure into an enclosure such as an aircraft cabin, and is a continuation-in-part of my copending application for Aircraft Cooling System and Method, Serial No. 583,054, filed March 16, 1945, and my application entitled Aircraft Cooling System and Method, Serial No. 739,555, filed April 5, 1947, now abandoned.

Although my invention is useful in various arts where conditioned air or other fluid must be supplied to an enclosure or other place of use, it is of particular utility in the aircraft industry wherein it is necessary to control air pressures and air temperatures, particularly where flying at medium and high altitudes.

It is customary to employ a rammed air intake for scooping up the air met with by the plane in flight, and for higher altitude flying, to employ supercharging means for increasing the pressure of the air delivered into the cabin. The work done by the ramming means in accelerating the air to cabin velocity, and the compressing action of the supercharger, heats the air to such an extent as to raise the temperature of the cabin to an uncomfortable level when the ambient air has a fairly high existing temperature.

The problem of cooling the air which is introduced under pressure into the cabin becomes one of prime necessity in connection with jet propelled aircraft adapted to operate at extremely high speeds and at very high altitudes. One of the objects of the invention is to meet this necessity by the provision of a cockpit pressurizing system for a jet propelled aircraft, incorporating means for cooling the air that is introduced under pressure into the cockpit.

Another object of the invention is to provide a pressurizing system which is not unduly complicated in construction. It is customary to incorporate in jet propelled aircraft an axial flow compressor driven by a gas turbine in the path of the jet propulsion gases, for compressing the air employed in the explosive mixture for the jet. One factor in the attainment of the last stated object is to bleed off a portion of the compressed air discharged from the axial flow compressor and to direct it to the cockpit for ventilating and pressurizing the same.

Another factor in the attainment of a pressurizing system embodying cooling mechanism which is not unduly complicated is utilization of the incoming air for cooling the air leaving the compressor, and avoiding the use of refrigerating mechanism, and in this respect, the invention has as a further object to provide a system for introducing into an enclosure, ventilating air under pressure, which system incorporates cooling mechanism utilizing the ventilating air itself as a refrigerant. More specifically, the invention aims to provide a system for pressurizing the air in an aircraft cabin, having means for cooling the air, which cooling means utilizes, as a coolant, the air entering the system through a rammed air inlet.

Where the cooling problem is an unusually difficult one—as, for example, in jet propelled aircraft—the invention contemplates a cooling system in which the cooling effect of the circulating air is compounded. To this end, the invention provides means for recirculating, through a secondary heat exchanger, a portion of the air which has been initially cooled in a primary heat exchanger, the compressed air on its way to the cabin or cockpit being passed first through the primary heat exchanger and then through the secondary heat exchanger so as to be successively subjected to lower temperatures and thereby cooled to a maximum extent.

A further object of the invention is to provide a cooling system which utilizes the work absorbing effect of an air turbine to further cool the compressed air on its way to the enclosure to be ventilated, and to utilize the energy acquired by such turbine for assisting the circulation of coolant air through the heat exchanger or heat exchangers.

A further object of the invention is to provide an aircraft cabin air conditioning system which utilizes the heating effect of the compression of the air for heating the cabin air, and which employs cooling means to modify the heating effect so as to maintain a temperature which is comfortable for the occupants of the cabin.

It is another object of my invention to provide mechanism for conditioning air for use in the cabin of an aircraft in which the air to be delivered to the cabin is placed under suitable pressure and is then brought into heat transfer relation with a flow of cooling air and in which the air to be delivered to the cabin is passed through a cooling turbine, the energy of which is used to drive a fan which acts on the flow of cooling air.

It is a still further object of my invention to provide a method of conditioning air for use in the cabin of an aircraft.

It is an object of the invention to provide a simple, compact and relatively light weight mechanism, which may be used in many locations but which is especially suitable for military aircraft, for supplying air under pressure to a cabin or other space and for cooling this air without the use of vapor cycle refrigerating means, but solely by use of air and the cooling effect of a heat absorbing engine, such as a cooling and power recovery turbine.

It is an object of the invention to provide a method and means for supplying compressed and cooled air to a cabin wherein air is compressed and then directed through a heat exchanger and a second cooling means to cool the compressed air, and wherein a regulated portion of the compressed and cooled air is diverted from the normal path of flow to the cabin and is brought into heat transfer relation to the compressed air.

It is an object of the invention to provide a method and means for supplying compressed and cooled air to a cabin wherein air is compressed and then directed through a heat exchanger to cool the compressed air, and wherein a portion of the compressed and cooled air is diverted from the normal path of flow to the cabin and is brought into heat transfer relation to the compressed air, there being means acting in response to variations in the pressure of the cabin air or the differential between cabin air pressure and ambient air pressure for varying the quantity of the diverted air, thereby controlling the temperature of the compressed air which is ultimately delivered into the cabin, and through this medium, controlling the temperature within the cabin.

It is another object of the invention to provide mechanism for conditioning air for use in the cabin of an aircraft in which the air to be delivered to the cabin is placed under suitable pressure, is brought into heat transfer relation with a flow of coolant and is then passed through a cooling turbine, there being means whereby a regulated portion of the air which has passed through the cooling turbine is directed back to the cooling means or heat exchanger equipment under control of the temperature of the cabin air in order to utilize the temperature reducing effect of the diverted air.

It is a further object of the invention to provide a mechanism adapted to provide cabin air suitably conditioned to accommodate the varying temperature and pressure conditions encountered by an aircraft designed for flight through a range from sea level to high altitude. For example, in a military aircraft designed to fly from sea level to an altitude of 40,000 feet, it is necessary, during low altitude flight, to supply to the cabin air at relatively low pressure and which has been cooled; whereas, at relatively high altitudes, it is necessary to supply to the cabin air compressed to higher pressure and cooled to lesser extent or warmed as the extremely high altitude and low temperatures of the ambient air are encountered. In a small military plane, for example, we may select for the cabin an air supply of ten pounds per minute at sea level, with a gradual reduction in the air supply to six pounds per minute at an altitude of 40,000 feet. Cabin pressure would be increased to four pounds per square inch above ambient pressure at an altitude of about 12,000 feet, if this is the structural strength limit of the cabin, this cabin pressure-ambient atmosphere differential of four pounds being maintained thereafter up to an altitude of 40,000 feet. If the cabin temperature is to be maintained at 80 degrees F., on hot summer days at sea level it will be necessary to cool the air fed to the cabin at about 55 degrees F., and as the aircraft ascends toward 40,000 foot altitude, the supply air temperature must be increased to approximately 180 degrees F. During the cold season, the cabin supply air must be heated at all flight altitudes.

An object of this invention is to provide a simple air conditioning device for aircraft having cooperating parts and controls whereby requirements such as those set forth in the preceding paragraph may be met in a satisfactory and economical manner.

Further objects and advantages of the invention may be brought out in the following part of the specification, wherein specific description has been employed for the purpose of presenting a full and complete disclosure of the invention without limiting the scope thereof defined in the appended claims.

Referring to the drawings which are for illustrative purposes only,

Figure 1:
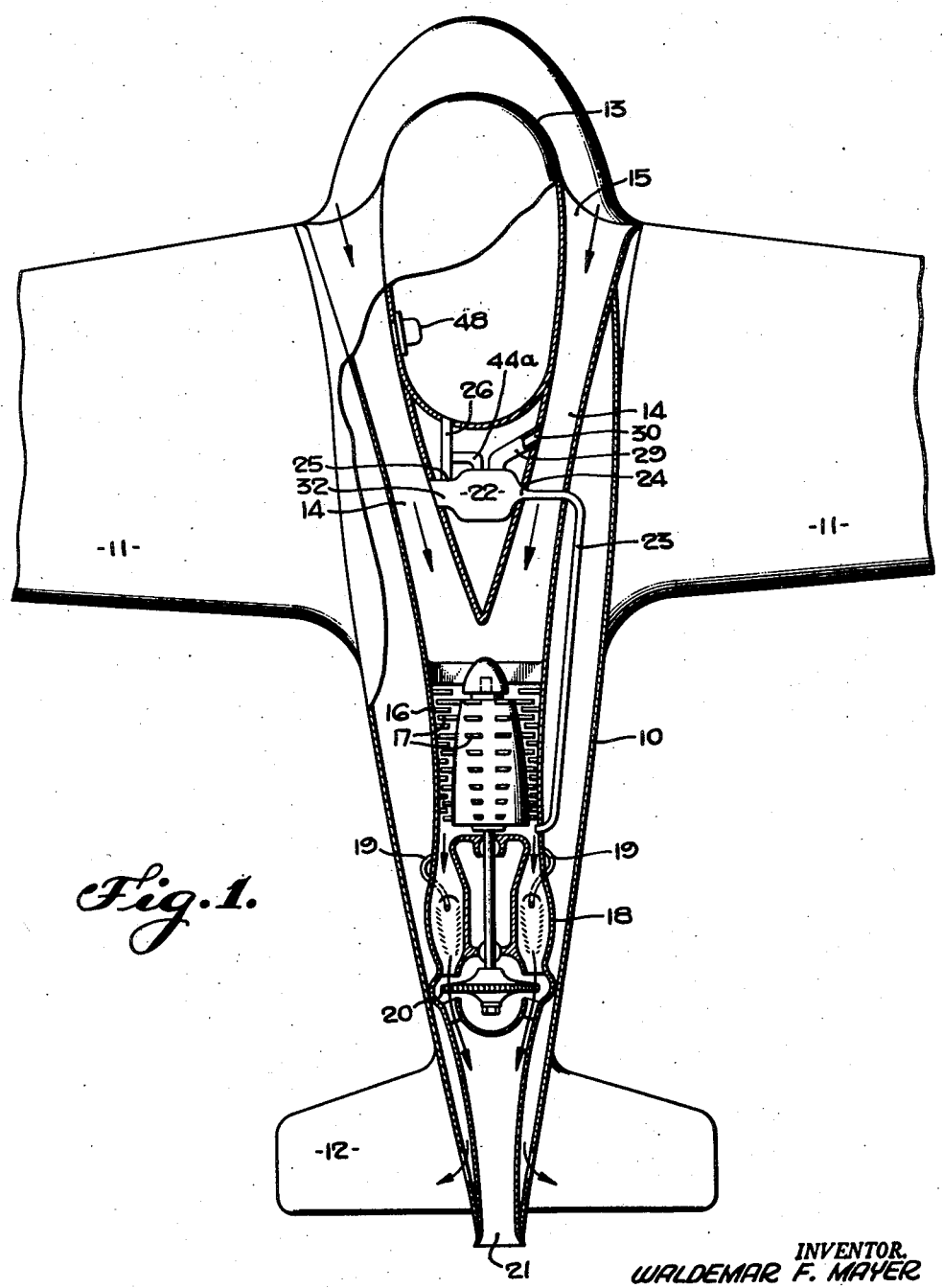
Fig. 1 is a plan view of a portion of a jet propelled aircraft embodying the invention, with portions thereof broken away and shown in section to illustrate the invention.

As an example of one form in which the invention may be embodied, I have shown in Fig. 1 a fuselage portion of a jet propelled airplane, the fuselage being shown, largely in section, at 10, portions of the wing being shown at 11, tail stabilizing surfaces at 12, and the cockpit at 13. Disposed between the cockpit 13 and the wall of the fuselage 10 are a pair of rammed air induction passages 14 having inlets 15 located in the leading edges of the root sections of the wing 11. The passages or ducts 14 converge and are joined to the forward end of the compressor chamber 16, in which is disposed an axial flow compressor 17. The rear end of the compressor chamber 16 is joined to the forward end of a combustion chamber 18 from which the burning gases, produced by combustion of the compressed air delivered thereto by the compressor 17 and fuel delivered thereto through fuel lines 19, are discharged through a gas turbine 20 and through the tail jet 21.

The present invention provides an air conditioning system particularly adapted for use in a plane such as that just described, although also adaptable for other types of aircraft. Such air conditioning system includes an air cooler, designated generally at 22, through which air under pressure from the discharge side of the compressor 17 is passed to the cockpit 13. From the compressor, the compressed air passes through a duct 23 to the inlet 24 (Fig. 2) of the cooler 22, and from the outlet 25 of the cooler, the cooled air is delivered through a duct 26 to the cockpit 13.

Figure 2:
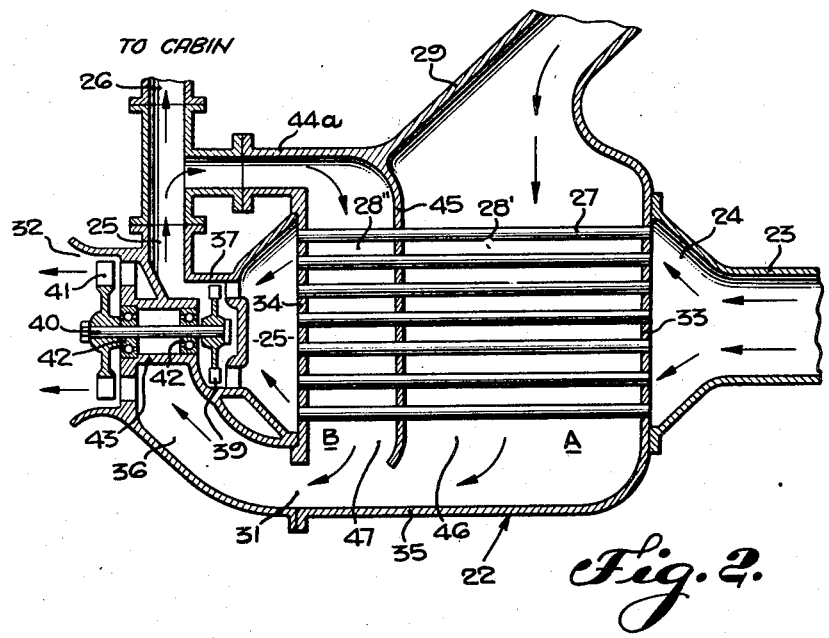
Fig. 2 is a detail sectional view through the cooling mechanism, taken in a horizontal plane.
Figure 3:
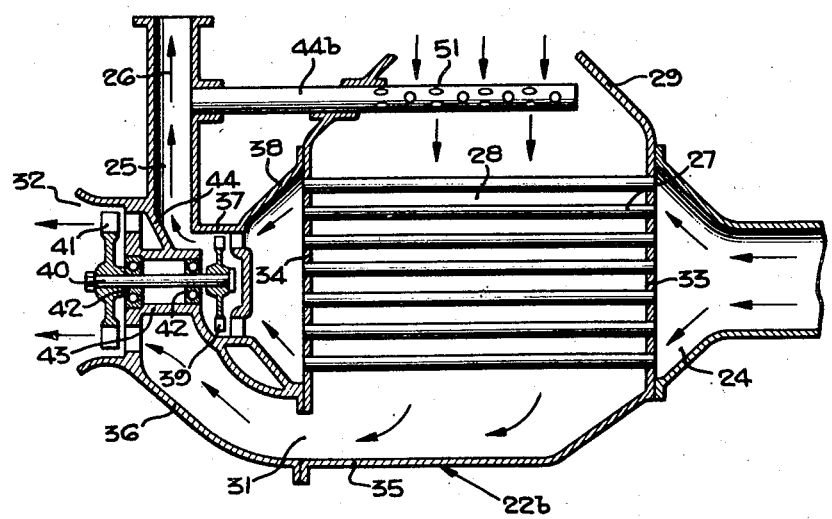
Fig. 3 is a horizontal sectional view of a cooling apparatus embodying a modified form of the invention.
Figure 4:
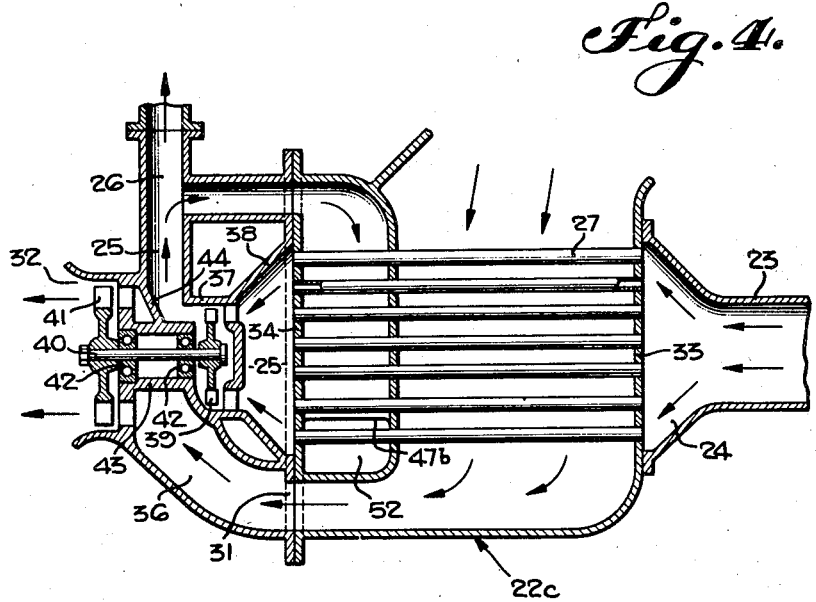
Fig. 4 is a horizontal sectional view of the cooling apparatus embodying another modified form of the invention.
Figure 5:
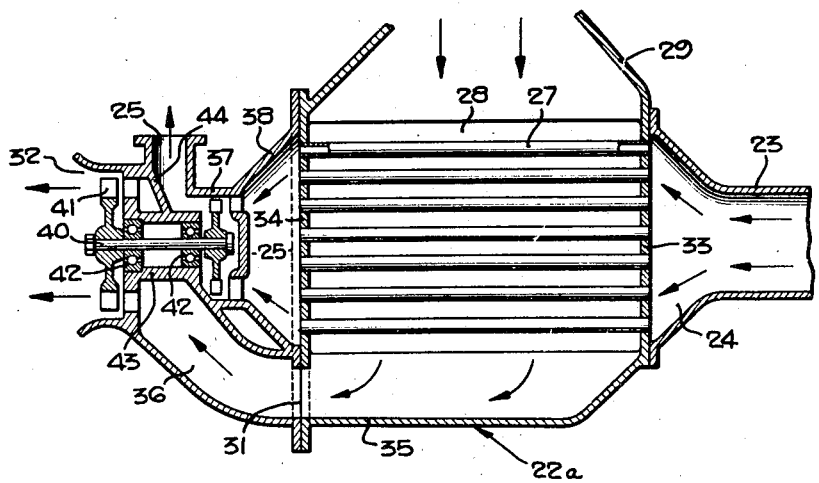
Fig. 5 is a horizontal sectional view of a cooling apparatus embodying a further modified form of the invention.

In the four forms of the invention disclosed in detail in Figs. 2 to 5 inclusive, corresponding parts are given corresponding numbers, and in certain instances an alphabetical suffix a, b, c or d has been added to the numbers used in Figs. 3 to 5 respectively.

In its simplest form, the heat exchanger 22 may, as shown in Fig. 5 (in which it is referred to by the reference numeral 22a) comprises a series of passages 27, through which the compressed air is passed from the inlet 24 to the outlet 25, and a series of interspaces 28, through which the coolant air may be passed in heat exchange relation to the passages 27.

The coolant air is taken from one of the rammed air induction ducts 14 by an induction tube 29 having an inlet 30 communicating with the duct 14, and is discharged from the cooler through a discharge passage 31 and an outlet 32, into one of the ducts 14.

The passages 27 may be in the form of tubes, the ends of which are mounted in headers 33 and 34 and forming therewith a heat exchanger core which may be formed as an independent unit and secured between the inlet 24 and outlet 25 by suitable flange connections of a conventional nature. The discharge passage 31 may be correspondingly formed in two sections—namely, a section 35 coextensive with the core and a section 36 extending around one side of the core outlet 25 and terminating in the coolant outlet 32.

Between the outlet 25 and the cooler core is an air turbine casing 37 which communicates with the discharge ends of the passages 27 through a header casing 38. The turbine casing 37 forms part of an air turbine 39, through which the compressed air, after being cooled, is passed to the outlet 25 and then to the cockpit 13. The turbine 39 abstracts work from the compressed air and thereby effects further cooling of the air as it leaves the cooler. The energy taken up by the turbine 39 is delivered, through a shaft 40 on which the turbine motor is mounted, to an axial flow fan 41 disposed in the coolant outlet 32. The shaft 40 is journaled in bearings 42 which are mounted in a bearing casing 43 in the common wall 44 separating the compressed air outlet 25 and turbine casing 37 from the coolant outlet passage 31. The coolant outlet 32 is coaxial with the header casing 38 in order that the fan and turbine rotor both may be mounted on the respective ends of a common shaft.

The coolant is discharged through the outlet 32 into a duct 14, through which it enters the compressor 17.

The coolant inlet 30 and coolant outlet 32 are so positioned with reference to each other and with reference to the duct 14 that the pressure at the inlet 30 will be greater than the pressure at the outlet 32, and consequently a flow of air through the coolant passages 27 will be induced by the flow through the duct 14. However, this pressure differential is made low enough so that the fan 41 may do a substantial amount of work on the air flowing through the coolant passages, and thereby provide sufficient load upon the turbine 39 to permit the latter to effect its cooling function. In some cases the inlet 30 and outlet 32 may be so related to the duct 14 (e. g., by being located in identical spots in the respective ducts) that the fan 41 will carry the entire burden of moving the air through the coolant passages. This will give a maximum cooling effect in the turbine 39, but will tend to reduce the cooling effect in the cooler core because of slower circulation of the coolant.

In the form of the invention shown in section in Fig. 2, the cooler 22 is divided into or provided with two heat exchanger sections A and B through which separate streams of coolant are passed. The main section A, which occupies a majority of the overall volume of the cooler, receives the incoming flow of air from the duct 14, conveyed to it through the coolant inlet passage 29, and the secondary heat exchanger section B receives a flow of coolant in the form of cooled air diverted from the compressed air outlet passage 26 through a recirculation passage 44. The separate heat exchanger sections may be formed by providing in the casing of the cooler core a partition wall 45 traversing the spaces between the compressed air passages 27, substantially parallel to the header walls 33 and 34, and dividing said spaces into primary coolant spaces 28' and secondary coolant spaces 28''. The spaces 28' collectively form a main coolant flow passage which is designated 46 and the spaces 28'' collectively form a secondary coolant flow passage which is designated 47. The flow passages 46 and 47 unite in the discharge passage 31, and the united streams of coolant air pass out through the outlet 32 to the duct 14 with which the outlet 32 communicates.

In the operation of the cooler shown in Fig. 2, heat is abstracted from the compressed air passing through the main heat exchanger section A of the cooler, by the primary coolant air coming from the inlet stream in the duct 14 and passing through the main coolant flow passage 46. As the compressed air, thus preliminarily cooled, passes through the secondary heat exchanger section B additional heat is abstracted therefrom by the cooled air flowing through the coolant flow passage 47, and the temperature is reduced to a level approaching the desired temperature for the cockpit. After leaving the secondary heat exchanger section B, the air passes through the air turbine 39 and is further cooled as it expands in the outlet 25. The air is now cooled to the desired temperature for the cockpit 13, and passes through the duct 26 into the cockpit. The pressure of the air in the cockpit 13 is maintained at a desired level by a pressure regulating outlet valve 48 which may be of a type adapted to maintain the pressure in the cabin at atmospheric level until the plane has ascended to a predetermined height such as, for example 10,000 feet, to then maintain the pressure in the cockpit at a fixed value while the plane ascends to higher levels until a second predetermined higher level such as, for example, 30,000 feet, is attained, and to thereafter reduce the pressure in the cabin in step with further reduction in ambient pressure, maintaining a predetermined pressure differential between the cockpit pressure and the ambient pressure, above said second predetermined level. The pressure differential selected is below the pressure delivered by the compressor 17, so that the latter may maintain a flow of air into the cockpit under all conditions.

In the form of the invention shown in Fig. 3, the coolant air diverted from the stream of coolant air flowing through the outlet passage 26 is diverted through a recirculation tube 44b to the main coolant inlet 29, where it is mixed, through a mixing nozzle 51, with the main stream of coolant air, from the duct 14. The mixed coolant is then passed through a single heat exchange section similar to that shown in Fig. 5.

The cooler 22c shown in Fig. 4 is the same as the cooler 22 of Fig. 2 except that the secondary coolant flow passage 47b, instead of uniting with the outlet passage 31, has a separate outlet 52 which may lead to the atmosphere outside the plane. This arrangement may be employed where the plane is operating in cold climates and it becomes undesirable to mix cooled air with the air entering the compressor 17, i. e., where it is desired to take full advantage of the heating effect of the ramming of the air into the duct 14 in order to preheat the air for combustion in the chamber 18.

Figure 6:
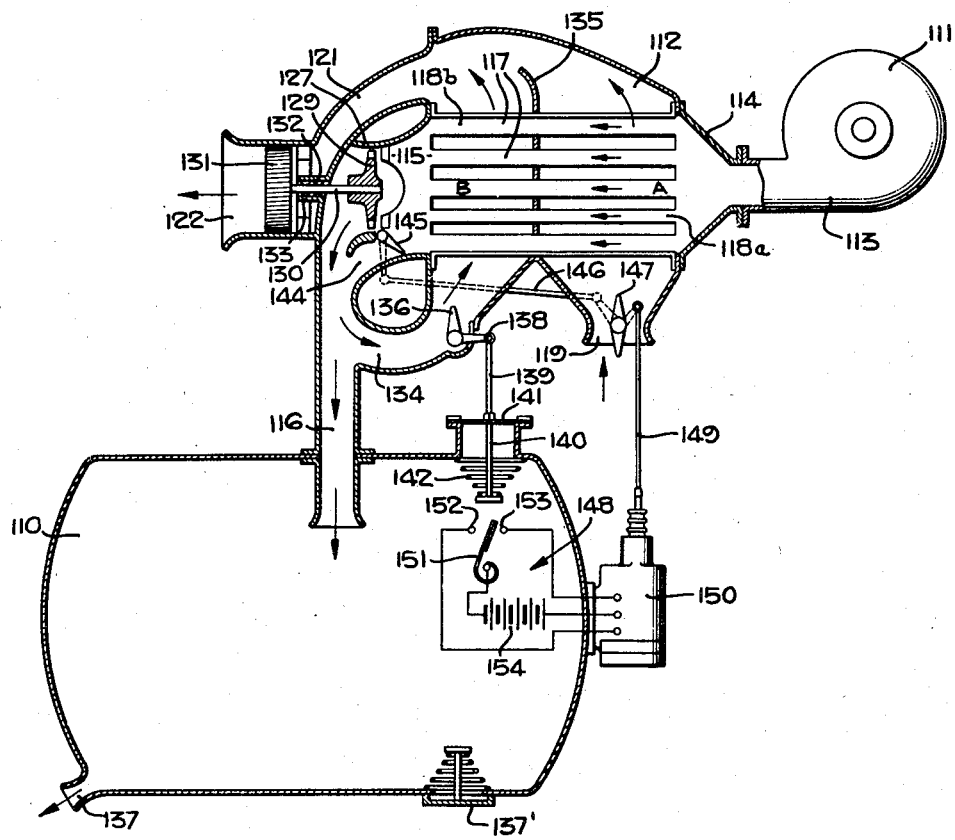
Fig. 6 is a schematic sectional view showing a preferred embodiment of the invention with the controls thereof adjusted for low altitude flight.
Figure 7:
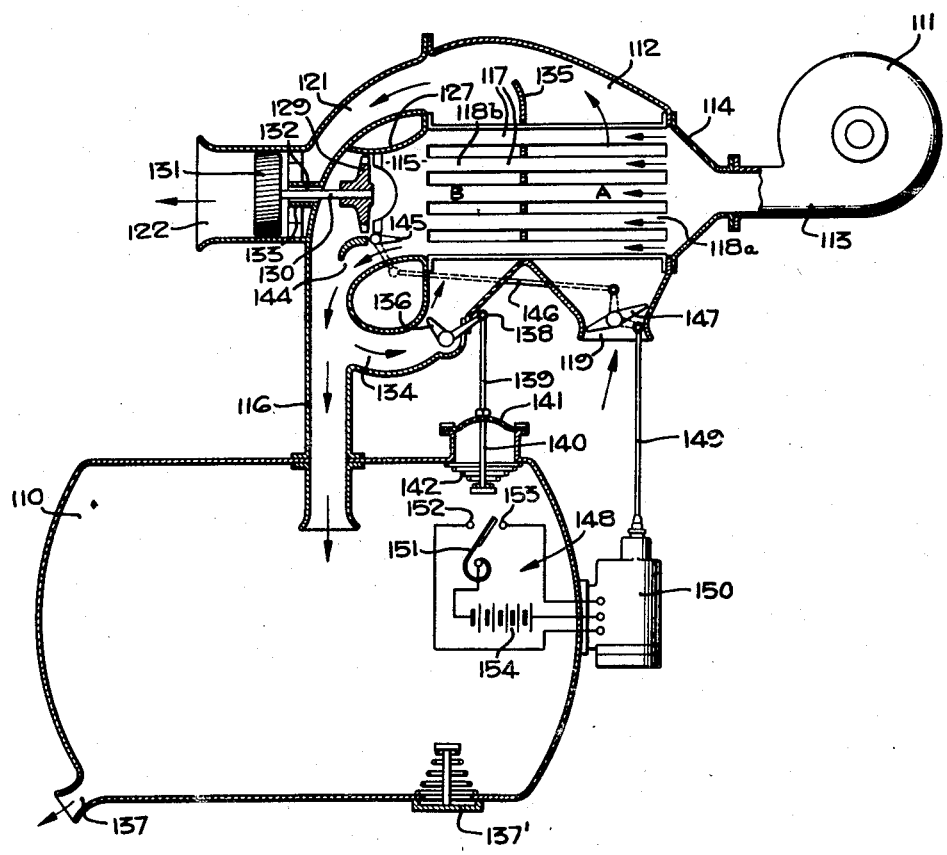
Fig. 7 is a view similar to Fig. 6, but showing the controls adjusted for high altitude flight.

In the form of the invention disclosed in Figs. 6 and 7, I have indicated an aircraft cabin or cockpit 100, into which air at suitable temperature and pressure is delivered by an air conditioning system which receives compressed air from a compressor 111, which may be any of the types of air pumping mechanism employed in aircraft, for example, jet engine compressor, supercharger, ram duct, etc. The air conditioning system includes a cooler or heat exchanger 112 having a compressed air inlet 114 connected through a duct 113 with the compressor 111. The cooler or heat exchanger 112 has first passages 117, which may consist of tubes, connecting the inlet 114 with the outlet space 115, and second transverse passage means 118a and 119b in heat transfer relation to the first passages, such second passages consisting of the spaces between the first passages 117 and being separated by the wall 135. In one practice of the invention coolant air, consisting of ambient air from one of the rammed air induction ducts of the aircraft, is directed into the coolant air passage 118a through an inlet 119 and is discharged from the cooler through a coolant discharge passage 121 and coolant outlet 122.

A conditioned air delivery duct 116 extends to the cabin 110. The cooler outlet 115 is connected to the delivery duct 116 by a turbine casing 127 in which a turbine rotor 129 is operative to form a cooling, power recovery, and pressure reducing turbine through which, under certain conditions of flight to be hereinafter explained, the compressed air, after being cooled in the heat exchanger, is passed to the delivery duct 116. The rotor 129 abstracts energy from the compressed air and thereby effects a further cooling of the air after it leaves the cooler. The energy recovered by the turbine rotor 129 is delivered, through a shaft 130 on which the rotor 129 is mounted, to an air pumping or suction means shown as an axial flow fan 131, fixed on the leftward end of the shaft 130. The shaft 130 is journaled in bearings 132 which are mounted in a bearing casing 133. The coolant outlet 122 is coaxial with the turbine casing 127 in order that the rotor 129 and the fan 131 may be mounted on the respective ends of the common shaft 130.

The cooler 112 is divided as described, by a partition wall 135 into passages 118a and 118b, which, with the cooperation of the passages 117, form two heat exchanger sections indicated by the reference characters A and B. The section A receives coolant air in its passage 118a from the exterior through the inlet 119 while the passage 118b of exchanger section B receives a flow of coolant air from the delivery duct 116 through a passage 134. The separate heat exchanger sections A and B may be formed as disclosed or may comprise two separate heat exchangers connected in series. Whether made as parts of a single cooler or made independent, the coolant air discharged therefrom is brought together in a single discharge passage 121 under the action of the fan 131.

A control valve 136 is disposed in the passage 134 to control the flow of coolant air through heat exchanger section B and is connected through an operating arm 138 and linkage 139 with a schematically shown pressure responsive actuating device 140 operatively associated with the aircraft cabin 110. The responsive device 140 is representative of any of the known types of pressure or pressure differential controls whereby desired pressures or pressure differentials are maintained in aircraft cabins. For purpose of explanation only, the cabin 110 is shown with an orifice outlet 137. The pressure in the cabin may be varied by changing the quantity of air delivered thereto through the duct 116, the rate of air flow being controlled in the present instance by varying the amount of air diverted through the passage 134 into the section B of the cooler.

The pressure responsive device 140 is schematically shown as being of cabin-ambient air pressure differential type, having a diaphragm 141 arranged to move the linkage 139 against the force of a spring 142. The relationship is such that at zero cabin-ambient pressure differential the valve 136 is held in open position as illustrated in Fig. 6. As the differential increases the valve moves until it is at the closed position of Fig. 7 at the maximum permissible differential. Should the differential tend to increase further, as it would upon a continuing climb, valve 136 is further moved, and in the same direction, into an open position. Before reaching the closed position the extent of closure is dependent upon the differential. After reaching that position the extent of opening is dependent upon the same factor.

A by-pass passage 144 connects the cooler outlet 115 with the cold air delivery duct 116, the flow of air therethrough being controlled by a valve 145. A similar valve 147 is positioned in inlet 119 of exchanger section A and the two valves are connected by a linkage 146. When maximum cooling is required, for example, when the aircraft is flying at low altitude on a hot day, the valve 147 is maintained in open position under the control of temperature responsive control means indicated generally at 148. Valves 147 and 145 are so connected by the linkage 146 that the latter when held in position substantially to close the by-pass 144. With the valves so positioned the entering air receives maximum cooling, first in the exchanger section B in which ambient air entering through inlet 119 passes in heat exchange relationship to the passages 117, and second in the turbine rotor 129 to which it delivers energy, absorbed by the turbine in driving the fan 131, and as a result of which it is expanded and cooled.

The temperature responsive control device 148 controlling the valves 145 and 147 includes a reversible electric motor driven actuator 150 adapted to shift the linkage 149 axially. A thermostat 151, forming a part of the temperature responsive control means 148, is arranged in the cabin and in relation to switch contacts 152 and 153 so as to connect a power source, shown as a battery 154, with either the forward or reverse windings or connections of the actuator 150, whereby the latter under the control of thermostat 151 may function progressively to close the valve 147 and to open the valve 145 as the temperature in the cabin 110 drops, and reversely to open the valve 147 and to close the valve 145 progressively as the temperature of the cabin air rises.

During a low altitude, hot day, flight, a portion of the energy present in the compressed air delivered to the cooler inlet 114 is expended in producing a low temperature, as may be required in the conditioned air delivered into the cabin 110. As the altitude of the aircraft rises, more of this energy may be utilized for maintenance of desired pressure in the cabin 110 for less is necessary for cooling effect, since with the rise of the aircraft to high altitudes it may be necessary to heat the air delivered to the cabin rather than to cool it. It will be recognized that the partition wall 135 may be eliminated in some practices of the invention. That is to say, a single heat exchanger having only one compartment or set of passages for the coolant air may be employed. Any reduction in air temperature in the coolant spaces of the heat exchanger or cooler 112, whether in the portion A or in the portion B, results in an increase in the heat absorption by the cooler; therefore, the wall 135 may be omitted without any change in the principle of operation of the invention.

Although I have described my invention and shown forms thereof adapted for use in aircraft and particularly jet propelled aircraft, it should be clearly understood that my invention is not limited to use in such aircraft and I wish it to be understood that the claims herein are not to be so limited but are to be broadly construed in accordance with the true scope and spirit of the invention as defined by the appended claims.

It should also be understood that although in Figs. 2 and 4 I have shown a cooler comprising two parts in a single structure that these two parts might be separated from each other and two separate coolers used. The term "cooler means" as employed in the claims is to be construed broad enough to include a cooler means in which the sections are integral, or cooler means in which the sections are in fact separated from each other and are embodied in separate cooler constructions.

In the specification and in the claims various terms have been used. The air which is directed to the cabin or cockpit, or enclosures of the aircraft, is referred to as the "compressed" air, the "cooled" air, or "cabin" air. The flow of air which is passed through the coolers for the purpose of cooling the cabin air is referred to as "cooling" air. The terms "cabin" and "cockpit" have been employed in the specification and claims and it should be understood that these terms are used in their broad sense and refer to any space or enclosure wherein conditioned air is to be supplied. Also the term air is used in its broad sense and includes various gases.

I claim:

1. Mechanism for conditioning the air for use in an aircraft cabin comprising: a compressor, and a pair of ramming inlet ducts extending along the respective sides of said cabin and converging behind said cabin, for directing a flow of air to the inlet of said compressor; a cooler disposed between the rear of said cabin and said ducts, said cooler having passage means for the flow therethrough of air from the discharge side of said compressor and having other passage means for the flow therethrough of a coolant in heat exchange relation to said first mentioned passage, means for delivering compressed air from the discharge side of said compressor to said first mentioned passage means and from said first mentioned passage means to said cabin, means for directing a flow of air from one of said ducts to said second mentioned passage means and from said second mentioned passage means to the inlet of said compressor, and means for diverting a portion of the compressed air which has passed through said first mentioned passage means, into said second mentioned passage means for auxiliary cooling of said first mentioned passage means.

2. Mechanism for conditioning air to be supplied to the cockpit of an aircraft, comprising: a combustion chamber, an air compressor for delivering air to said combustion chamber for supporting combustion therein, a pair of ramming air ducts leading from the root sections of said wings along the respective sides of said cockpit, converging behind said cockpit, and discharging into said compressor, a cooler disposed between the rear of said cockpit and said converging portions of said ducts, said cooler having passages for the flow therethrough of compressed air from said compressor and having interspaces for the flow therethrough of a coolant air, means for diverting a portion of the air flowing through said duct means into said interspaces for cooling the air flowing through said passages and then discharging said coolant air into said duct means, means for delivering compressed air from the discharge side of said compressor to said passages and then from said passages to said cockpit, and means for diverting a portion of the compressed air which has passed through said passages into said interspaces for auxiliary cooling of said passages.

3. Mechanism for conditioning air for the cabin of an aircraft having a compressor and a rammed air inlet for said compressor comprising: a cooler having passages for the flow therethrough of compressed air from said compressor and having an inlet and an outlet for said passages, said cooler having interspaces for the flow of a coolant in heat exchange relation to said passages, and means providing a plurality of flow paths through said interspaces, one of which is in the region of the inlet ends of said passages and the other of which is in the region of the outlet ends of said passages, means for directing a flow of air from the discharge side of said compressor to the inlet for said passages, a discharge duct for directing air from the outlet for said passages to said cabin, means for directing a flow of coolant air from said rammed air inlet to said first mentioned coolant flow path, and means for recirculating a portion of the cooled air flowing through said discharge duct, through said second mentioned flow path.

4. Method for conditioning the air in an enclosure comprising: a compressor; an inlet for said compressor; a cooler having passages for the flow of compressed air therethrough and having an inlet and outlet for said passages and having interspaces for the flow of a coolant in heat exchange relation to said passages, and an inlet and an outlet for said interspaces; means for directing a flow of compressed air from said compressor to the inlet for said passages; means for directing the cooled air from the outlet for said passages to said enclosure; means for directing a flow of air to the inlet for said interspaces; and means for delivering a portion of the cooled air passing through said passage outlet into the coolant air stream entering said interspaces.

5. Mechanism as defined in claim 4 wherein said last means comprises a nozzle extending into said interspace inlet, parallel to said passages, and having a multiplicity of jet outlets for dispersing and mixing the cooled air into and with the main coolant stream.

6. Mechanism for conditioning air for the cabin of a high altitude aircraft, comprising: a compressor, duct means for directing air to the inlet of said compressor, a cooler having passages for the flow therethrough of compressed air from said compressor and having interspaces between said passages and means forming a plurality of flow paths through said interspaces, means for directing a flow of compressed air from the discharge side of said compressor to said passages and from said passages to said cabin, means for directing a flow of air from said duct means through one of said interspace flow paths and back into said duct means for initial cooling of said compressed air flowing through said passages, and means for recirculating cooled air from the discharge side of said passages through the other of said flow paths to the atmosphere for auxiliary cooling of the air flowing through said passages.

7. Mechanism for conditioning air for an enclosure comprising: a compressor; duct means for delivering air to the inlet of said compressor; cooler having first and second passage means in heat transfer relation to each other; means for directing a flow of compressed air from the discharge side of said compressor to said first passage means and from said first passage means to said enclosure; means for directing a separate flow of air through said second passage means for cooling said compressed air flowing through said first passage means; and means for delivering cooled air from the discharge side of said first passage means, into said second passage means for assisting said separate flow of air in cooling the air flowing through said first passage means.

8. Mechanism for conditioning air for an enclosure comprising: a compressor; duct means for delivering air to the inlet of said compressor; a cooler having first and second passage means in heat transfer relation to each other; means for directing a flow of compressed air from the discharge side of said compressor to said first passage means and from said first passage means to said enclosure; means for directing a flow of air through said second passage means for cooling said compressed air flowing through said first passage means; a cooling turbine through which the cooled air flows after flowing through said first passage means; means for delivering cooled air from the discharge side of said cooling turbine, into said second passage means for assisting in cooling the air flowing through said first passage means; an outlet passage leading from said second passage means of said cooler; and a fan in said outlet means driven by said cooling turbine.

9. Mechanism for conditioning air for an enclosure comprising: air compressing means; first and second cooler means through which air from said air compressing means is passed; means for delivering said compressed air from said cooler means to said enclosure; means for delivering cooling air through said first cooler means in heat transfer relation to said compressed air; and means for delivering cooled air from the discharge side of said second cooler means through the coolant passages of said second cooler means in heat transfer relation to said compressed air.

10. Mechanism for conditioning air for an enclosure comprising: air compressing means; first and second cooler means through which air from said air compressing means is passed; means for delivering said compressed air from said cooler means to said enclosure; means for delivering cooling air through said first cooler means in heat transfer relation to said compressed air; means for diverting cooled air from the discharge side of said second cooler means through the coolant passages of said second cooler means in heat transfer relation to said compressed air; and common outlet means for the cooling air passing through said first cooler means and the diverted air passing through said second cooler means.

11. Mechanism for conditioning air for an enclosure comprising: air compressing means; first and second cooler means through which air from said air compressing means is passed; means for delivering said compressed air from said cooler means to said cabin; means for delivering cooling air through said first cooler means in heat transfer relation to said compressed air; means for diverting cooled air from the discharge side of said second cooler means through the coolant passages of said second cooler means in heat transfer relation to said compressed air; an outlet for said cooling air passing through said first cooler means; and a separate outlet for the diverted air passing through said second cooler means.

12. Mechanism for conditioning air for an enclosure comprising: air compressing means; first and second cooler means through which air from said air compressing means is passed; means for delivering said compressed air from said cooler means to said enclosure; means for delivering cooling air through said first cooler means in heat transfer relation to said compressed air; a cooling turbine on the discharge side of said second cooler means through which said compressed air is passed; and means for delivering cooled air from the discharge side of said cooling turbine through said second cooler means in heat transfer relation to said compressed air.

13. Mechanism for conditioning air for an enclosure comprising: a conduit for delivering air under pressure to said enclosure; first and second cooler means in said conduit through which said air is passed; a cooling turbine in said conduit on the discharge side of said second cooler means; means for passing cooling air through said first cooler means in heat transfer relation to said air delivered to said enclosure; a fan driven by said cooling turbine, for driving said cooling air; and means on the discharge side of said cooling turbine for passing cooled air from said conduit through said second cooler means in heat transfer relation to said enclosure air.

14. Mechanism for conditioning air for an enclosure comprising: a conduit for delivering air under pressure to said enclosure; cooler means in said conduit, through which said air is passed; a cooling turbine on the discharge side of said cooler means; means for passing cooling air to and from said cooler means, said cooling air being passed in heat transfer relation to said enclosure air; a fan in said last mentioned means on the discharge side of said cooler means, said fan being driven by said cooling turbine; and means on the discharge side of said cooling turbine for passing a portion of the enclosure air flowing through said conduit, through said cooler means.

15. A method of conditioning air to be supplied to an enclosure, the steps of: compressing the air to be supplied to the enclosure; cooling the compressed air by passing it in heat transfer relation to other air; passing said compressed and cooled air through a cooling turbine to further reduce its temperature; using the energy derived from said cooling turbine for driving the said other air used to cool said air delivered to said enclosure; and passing a portion of the air leaving said cooling turbine into heat transfer relation to said enclosure air, before said enclosure air reaches said cooling turbine to additionally cool the enclosure air.

16. A method of conditioning air to be supplied to an enclosure, the steps of: compressing the air to be supplied to the enclosure; cooling the compressed air by passing it in heat transfer relation to other air; expanding the cooled and compressed air to further cool the same; and passing a portion of the expanded and cooled air in heat transfer relation to said first-mentioned enclosure air before the same is expanded.

17. A method of conditioning air to be supplied to an enclosure, the steps of: passing a flow of compressed air which is to be delivered to the enclosure in heat transfer relation to other air to cool the same; mechanically further cooling the cooled enclosure air; and passing a portion of the further cooled enclosure air in heat transfer relation to the first-mentioned enclosure air before it is mechanically cooled.

18. Mechanisms for conditioning air for an enclosure comprising: a compressor; duct means for delivering air to the inlet of said compressor; cooler means having first and second passage means in heat transfer relation to each other; means for directing a flow of compressed air from the discharge side of said compressor to said first passage means and from said first passage means to said enclosure; expansion cooling means through which air flows after flowing through said first passage means; and means for passing cooled air from the discharge side of said expansion cooling means through said second passage means of said cooler to a place of disposal other than said enclosure.

19. Mechanism for conditioning air for an enclosure comprising: a compressor; duct means for delivering air to the inlet of said compressor; cooler means having first and second passage means in heat transfer relation to each other; means for directing a flow of compressed air from the discharge side of said compressor to said first passage means and from said first passage means to said enclosure; a mechanical cooling device for cooling air discharged from said first passage means; and means for passing a portion of the cooled air from said mechanical cooling device through said second passage means of said cooler means to a place of disposal other than said enclosure.

20. Means for conditioning air for an enclosure, comprising: a cooler having first and second passage means in heat transfer relation; means for moving air through said first passage means of said cooler; mechanical cooling means downstream from said cooler for cooling the air discharged from said first passage means; means for conducting a portion of the air from said mechanical cooling means to said enclosure; and means for passing a portion of the air from said mechanical cooling means through said second passage means of said cooler to a place of disposal other than said enclosure.

21. Mechanism for conditioning compressed air which is conducted from a source of compressed air to a cabin, comprising: cooler means having first and second passage means in heat transfer relation to each other; means for directing a flow of compressed air from said source through said first passage means to said cabin; means for directing a flow of coolant through said second passage means for cooling the compressed air flowing through said first passage means; and means operating under control of air which has passed through said first passage means for delivering air which has passed through said first passages means into heat exchange relation to the air in said first passage means.

22. Mechanism for conditioning compressed air which is conducted from a source of compressed air to a cabin, comprising: cooler means having first and second passage means in heat transfer relation to each other; means for directing a flow of compressed air from said source through said first passage means of said cooler means to said cabin; means for directing a flow of air through said second passage means for cooling the compressed air flowing through said first passage means; a duct for delivering into said second passage means air which has passed through at least a portion of said first passage means; flow control means for controlling the flow through said duct; and means responsive to air pressure for regulating said flow control means.

23. Mechanism for conditioning compressed air which is conducted from a source of compressed air to a cabin, comprising: cooler means having first and second passage means in heat transfer relation to each other; means for directing a flow of compressed air from said source through said first passage means to said cabin; means for directing a flow of coolant through said second passage means for cooling said compressed air flowing through said first passage means; a cooling turbine in the path of flow of at least a part of the compressed air for cooling the same; and means for operating under control of air which has passed through said cooling turbine for conducting cooled air from the discharge side of said cooling turbine in heat exchange relation to said compressed air.

24. Mechanism for conditioning compressed air which is conducted from a source of compressed air to a cabin, comprising: cooler means having first and second passage means in heat transfer relation to each other; a second cooling means; means for directing a flow of compressed air from said source through said first passage means and said second cooling means to said cabin; means for directing a flow of coolant through said second passage means for cooling the compressed air flowing through said first passage means; means operating under control of air which has passed through said first passage means for delivering air which has passed through said first passage means into heat exchange relation to the air in said first passage means; and means for bypassing compressed air from said first passage means around said second cooling means to said cabin.

25. Mechanism for conditioning compressed air which is conducted from a source of compressed air to a cabin, comprising: cooler means having first and second passage means in heat transfer relation to each other; means for directing a flow of compressed air from said source through said first passage means to said cabin; means for directing a flow of air through said second passage means for cooling said compressed air flowing through said first passage means, a cooling turbine in the path of flow of at least a part of the compressed air for cooling the same; means operating under control of air which has passed said cooling turbine for delivering cooled air from the discharge side of said cooling turbine, into said second passage means for assisting in cooling the air flowing through said first passage means; and air pumping means driven by said turbine for producing movement of at least a portion of the air which passes through said second passage.

26. Mechanism for conditioning compressed air which is conducted from a source of compressed air to a cabin, comprising: cooler means having first and second passage means in heat transfer relation to each other; means for directing a flow of compressed air from said source through said first passage means to said cabin; means for directing a flow of coolant through said second passage means for cooling said compressed air flowing through said first passage means; a cooling turbine in the path of flow of at least a part of the compressed air for cooling the same; means operating under control of air which has passed through said cooling turbine for conducting cooled air from the discharge side of said cooling turbine in heat exchange relation to said compressed air; and means for bypassing air from said first passage means around said turbine to said cabin.

27. Mechanism for conditioning compressed air which is conducted from a source of compressed air to a cabin, comprising: cooler means having first and second passage means in heat transfer relation to each other; means for directing a flow of compressed air from said source through said first passage means to said cabin; means for directing a flow of coolant through said second passage means for cooling said compressed air flowing through said first passage means; a cooling turbine in the path of flow of at least a part of the compressed air for cooling the same; means operating under control of air which has passed through said cooling turbine for conducting cooled air from the discharge side of said cooling turbine in heat exchange relation to said compressed air; and means responsive to the temperature of air which has been cooled by said turbine for bypassing air from said first passage means around said turbine to said cabin.

28. Mechanism for conditioning compressed air which is conducted from a source of compressed air to a cabin, comprising: cooler means having first and second passage means in heat transfer relation to each other; means for directing a flow of compressed air from said source through said first passage means to said cabin; means for directing a flow of coolant through said second passage means for cooling said compressed air flowing through said first passage means; a cooling turbine in the path of flow of at least a part of the compressed air for cooling the same; means operating under control of air which has passed through said cooling turbine for conducting cooled air from the discharge side of said cooling turbine in heat exchange relation to said compressed air; and means responsive to the temperature of air which has been cooled by said turbine for bypassing air from said first passage means around said turbine to said cabin and reducing the flow of said coolant through said second passage means.

29. Mechanism for conditioning compressed air which is conducted from a source of compressed air to a cabin, comprising: cooler means having first and second passage means in heat transfer relation to each other; means for directing a flow of compressed air from said source through said first passage means to said cabin; means for directing a flow of coolant through said second passage means for cooling said compressed air flowing through said first passage means; a cooling turbine in the path of flow of at least a part of the compressed air for cooling the same; and means for bypassing air from said first passage means around said turbine to said cabin and reducing the flow of said coolant through said second passage means.

30. Mechanism for conditioning compressed air which is conducted from a source of compressed air to a cabin, comprising: cooling means having first and second passage means in heat transfer relation to each other; means for directing a flow of compressed air from said source through said first passage means to said cabin; means for directing a flow of coolant through said second passage means for cooling said compressed air flowing through said first passage means; a cooling turbine in the path of flow of at least a part of the compressed air for cooling the same; and means responsive to the temperature of air which has been cooled by said turbine for bypassing air from said first passage means around said turbine to said cabin and reducing the flow of said coolant through said second passage means.

31. Mechanism for conditioning compressed air which is conducted from a source of compressed air to a cabin, comprising: first and second cooler means through which compressed air from said source is passed; means for delivering said compressed air from said cooler means to said cabin; means for delivering cooling air through said first cooler means in heat transfer relation to said compressed air; and means operating under control of compressed air which is passed through said cooler means to direct a portion of the air which has been cooled by said cooler means through said second cooler means in heat exchange relation to the compressed air passing therethrough.

32. Mechanism for conditioning compressed air which is conducted from a source of compressed air to a cabin, comprising: first and second cooler means through which compressed air from said source is passed, the first of said cooler means comprising a heat exchanger and the second of said cooler means being so formed as to cool the compressed air by expansion; means for delivering said compressed air from said cooler means to said cabin; means for delivering cooling air through said first cooler means in heat transfer relation to said compressed air; and means operating under control of compressed air which is passed through said cooler means to direct a portion of the air which has been cooled by said cooler means through said second cooler means in heat exchange relation to the compressed air passing therethrough.

33. A method of conditioning air to be supplied to a cabin, the steps of: compressing the air; cooling the compressed air by passing it in heat transfer relation to coolant air; passing at least a portion of said compressed and cooled air through a cooling turbine to further reduce its temperature; and conducting air which has been cooled by said cooling turbine in quantities determined by the pressure of compressed air which has passed through said turbine as coolant air in heat transfer relation to the compressed air which has not been cooled by said turbine to produce a reduction in the cooled compressed air supplied to the cabin.

34. A method of conditioning air to be supplied to a cabin, the steps of: compressing the air; cooling the compressed air by passing it in heat transfer relation to coolant air; passing at least a portion of said compressed and cooled air through a cooling turbine to further reduce its temperature; conducting air which has been cooled by said cooling turbine in quantities determined by the pressure of compressed air which has passed through said turbine as coolant air in heat transfer relation to the compressed air which has not been cooled by said turbine to produce a reduction in the cooled compressed air supplied to the cabin; and using the energy recovered by said turbine to drive at least a portion of the coolant air.

35. A method of conditioning air to be supplied to a cabin, the steps of: compressing the air; cooling the compressed air by passing it in heat transfer relation to other air; and passing, under control of the cabin air, portions of the compressed and cooled air in heat transfer relation to compressed air, to control the temperature of the cabin air.

36. A method of conditioning air to be supplied to a cabin, the steps of: compressing the air; cooling the compressed air by passing it in heat transfer relation to other air; expanding the cooled compressed air to further cool the same; and passing, under control of the cabin air, portions of the expanded air in heat transfer relation to the compressed air, to control the temperature of the cabin air.

37. A method of conditioning air to be supplied to a cabin, the steps of: compressing the air; cooling the compressed air by passing it in heat transfer relation to other air; expanding the cooled compressed air to further cool the same; passing, under control of the cabin air, portions of the expanded air in heat transfer relation to the compressed air, to control the temperature of the cabin air; and in correlation with changes in temperature of the cabin air, controlling the extent to which the compressed air is cooled.

38. Mechanism for conditioning compressed air to be delivered to a cabin, comprising: means to conduct said compressed air to said cabin, first heat transfer means to conduct ambient air in heat exchange relationship to said means, an air turbine to extract work from said compressed air, a bypass for said compressed air around said turbine, valve means controlling the flow of air through said first heat transfer means and through said bypass, and cabin-temperature-controlled means to open and close said valves.

39. Mechanism for conditioning the compressed air to be delivered to the cabin of an aircraft, comprising: passage means to conduct said compressed air to said cabin, first heat transfer means to conduct ambient air in heat exchange relationship to said passage means, an air turbine to extract work from said compressed air and thereby lower its temperature, a second heat transfer means in heat exchange relationship to said passage means and connected to the exhaust of said turbine to receive and to conduct air therefrom, valve means controlling the flow of air through said second heat transfer means, and cabin-ambient-differential-pressure operated means connected to said valve to control the position thereof.

40. In mechanism for conditioning a gaseous fluid which is conducted from a source of said gaseous fluid to a compartment: cooler means having first and second passage means in heat transfer relation; means directing a flow of said gaseous fluid from said source through said first passage means to said compartment; means directing a flow of coolant through said second passage means to cool the said gaseous fluid which flows through said first passage means; and means operating, under control of said gaseous fluid which has passed through said first passage means, to pass gaseous fluid which has been cooled by said cooler means in heat exchange relation to said gaseous fluid in said first passage means.

41. In mechanism for conditioning a gaseous fluid which is conducted from a source of said gaseous fluid to a compartment: cooler means having first and second passage means in heat transfer relation; means directing a flow of said gaseous fluid from said source through said first passage means to said compartment; means directing a flow of coolant through said second passage means to cool the said gaseous fluid which flows through said first passage means; a gaseous fluid driven heat expansion engine in the path of flow of at least a portion of said gaseous fluid to cool the same; and means operating, under control of said gaseous fluid which has passed through said engine, to pass gaseous fluid which has been cooled by said engine in heat exchange relation to said gaseous fluid in said path of flow ahead of said engine.

42. In mechanism for conditioning a gaseous fluid which is conducted from a source of said gaseous fluid through a cooling heat exchanger to a compartment: a gaseous fluid driven heat extraction engine in the path of flow of at least a portion of said gaseous fluid to cool the same; and means operating, under control of said gaseous fluid which has passed through said engine, to pass gaseous fluid which has been cooled by said engine in heat exchange relation to said gaseous fluid in said path of flow ahead of said engine.

43. In mechanism for conditioning a gaseous fluid which is conducted from a source of said gaseous fluid to a compartment: cooler means having first and second passage means in heat transfer relation; means directing a flow of said gaseous fluid from said source through said first passage means to said compartment; means directing a flow of coolant through said second passage means to cool the said gaseous fluid which flows through said first passage means; a gaseous fluid driven heat expansion engine in the path of flow of at least a portion of said gaseous fluid to cool the same; means operating, under control of said gaseous fluid which has passed through said engine, to pass gaseous fluid which has been cooled by said engine in heat exchange relation to said gaseous fluid in said path of flow ahead of said engine; pumping means operative to move said coolant through said second passage means; and drive means for said pumping means driven by power recovered by said engine.

44. In mechanism for conditioning a gaseous fluid which is conducted from a source of said gaseous fluid through a cooling heat exchanger to a compartment: a gaseous fluid driven heat extration engine in the path of flow of at least a portion of said gaseous fluid to cool the same; means operating, under control of said gaseous fluid which has passed through said engine, to pass gaseous fluid which has been cooled by said engine in heat exchange relation to said gaseous fluid in said path of flow ahead of said engine; and duct means to bypass gaseous fluid from said source around said engine to said compartment.

45. In mechanism for conditioning a gaseous fluid which is conducted from a source of said gaseous fluid through a path of flow to a compartment: expansion cooling means in said path of flow to cool said gaseous fluid; and means operating under control of the gaseous fluid which has passed through said expansion cooling means to pass gaseous fluid, which has been cooled, in heat exchange relation to said gaseous fluid in said path of flow upstream from said expansion cooling means.

46. In mechanism for conditioning a gaseous fluid which is conducted from a source of said gaseous fluid through a path of flow to a compartment: a cooling heat exchanger in said path of flow to cool said gaseous fluid; expansion cooling means in said path of flow to cool said gaseous fluid; means operating under control of the gaseous fluid which has passed through said expansion cooling means to pass gaseous fluid, which has passed through said expansion cooling means, in heat exchange relation to said gaseous fluid in said path of flow upstream from said expansion cooling means; and duct means to bypass gaseous fluid from said source around said expansion cooling means to said compartment.

47. Mechanism for conditioning air for an enclosure comprising: a conduit for delivering air under pressure to said enclosure; cooler means having first and second passage means in heat transfer relation, said first passage means being connected in said conduit; mechanical cooling means having a turbine in said conduit on the discharge side of said cooler means; means for passing cooling air through said second passage means; and means on the discharge side of said turbine for passing cooled air from said conduit through said second passage means.

WALDEMAR F. MAYER.

REFERENCES CITED

The following references are of record in the file of this patent:

UNITED STATES PATENTS

| Number | Name | Date |
|---|---|---|
| 2,304,151 | Crawford | Dec. 8, 1942 |
| 2,391,838 | Kleinhans | Dec. 25, 1945 |
| 2,412,110 | Williams | Dec. 3, 1946 |
| 2,479,991 | Wood | Aug. 23, 1949 |

FOREIGN PATENTS

| Number | Country | Date |
|---|---|---|
| 23,529 | Great Britain | Nov. 3, 1908 |

Certificate of Correction

Patent No. 2,557,101                                        June 19, 1951

WALDEMAR F. MAYER

It is hereby certified that error appears in the printed specification of the above numbered patent requiring correction as follows:

Column 7, lines 18 and 19, for "cockpit 100" read *cockpit 110*; column 10, line 63, for "Method" read *Mechanism*; column 19, line 2, for "extration" read *extraction*;

and that the said Letters Patent should be read as corrected above, so that the same may conform to the record of the case in the Patent Office.

Signed and sealed this 9th day of October, A. D. 1951.

[SEAL]

THOMAS F. MURPHY,
*Assistant Commissioner of Patents.*